United States Patent
Byrne et al.

(10) Patent No.: US 6,986,193 B2
(45) Date of Patent: Jan. 17, 2006

(54) GOLF CLUB HEAD COMPOSED OF DAMASCENE PATTERNED METAL

(75) Inventors: Wayne H. Byrne, Murrieta, CA (US); Ronald K. Hettinger, Oceanside, CA (US); Uday V. Deshmukh, Oceanside, CA (US); Herbert Reyes, Laguna Niguel, CA (US)

(73) Assignee: Callaway Golf Company, Carlsbad, CA (US)

(*) Notice: Subject to any disclaimer, the term of this patent is extended or adjusted under 35 U.S.C. 154(b) by 0 days.

(21) Appl. No.: 10/904,848

(22) Filed: Dec. 1, 2004

(65) Prior Publication Data

US 2005/0132557 A1  Jun. 23, 2005

Related U.S. Application Data

(62) Division of application No. 10/248,067, filed on Dec. 13, 2002, now Pat. No. 6,878,074.

(60) Provisional application No. 60/343,865, filed on Dec. 26, 2001, now abandoned.

(51) Int. Cl.
  *B21J 1/04* (2006.01)
(52) U.S. Cl. .......................... 29/514; 29/557
(58) Field of Classification Search ................ 29/514, 29/557, 558
  See application file for complete search history.

(56) References Cited

U.S. PATENT DOCUMENTS

| | | | |
|---|---|---|---|
| 4,399,611 A | * | 8/1983 | Maringer ..................... 30/350 |
| 4,881,430 A | | 11/1989 | Hubbard |
| 5,185,044 A | | 2/1993 | Verhoeven et al. |
| 5,350,637 A | | 9/1994 | Ketcham et al. |
| 5,445,685 A | | 8/1995 | Strum et al. |
| 5,815,790 A | * | 9/1998 | Billgren et al. ................ 419/5 |
| 6,348,015 B1 | | 3/2000 | Kosmatka |
| 6,338,683 B1 | | 1/2002 | Kosmatka |
| 6,364,789 B1 | | 4/2002 | Kosmatka |
| 2003/0119599 A1 | | 6/2003 | Bryne et al. |

OTHER PUBLICATIONS

Damascene, LLC—website—www.dama-golf.com.*

* cited by examiner

*Primary Examiner*—David P. Bryant
*Assistant Examiner*—Christopher M. Koehler
(74) *Attorney, Agent, or Firm*—Michael A. Catania; Elaine H. Lo

(57) ABSTRACT

A golf club head composed of a damascene patterned metal, such as a Damascus steel, is disclosed. The golf club head may be a putter head or an iron-type club head with a majority of the club head body formed of the damascene patterned metal, or a wood-type club head or an iron-type club head with a damascene patterned metal face insert.

11 Claims, 6 Drawing Sheets

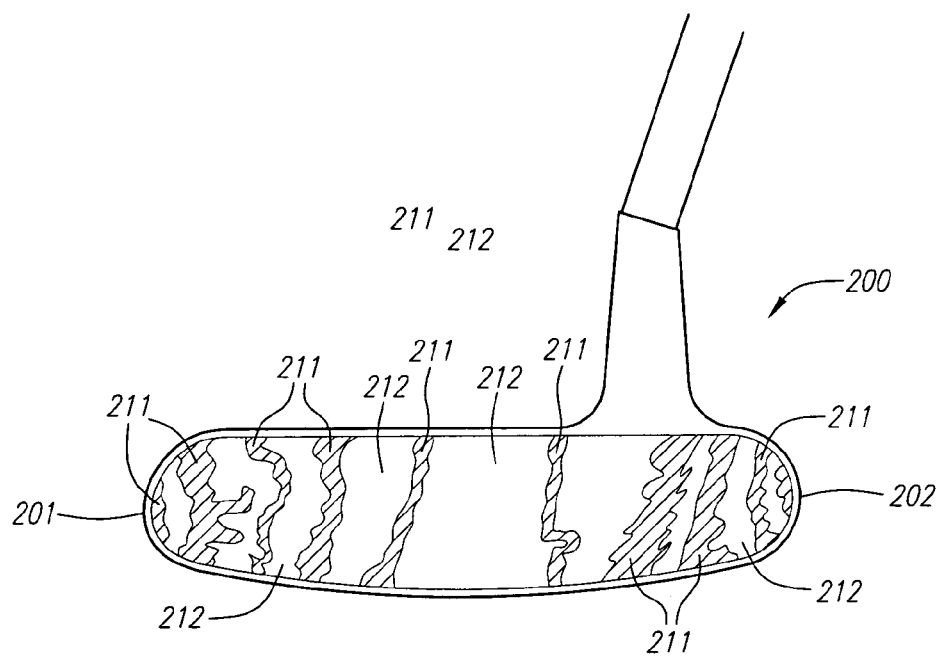
FIG. 3
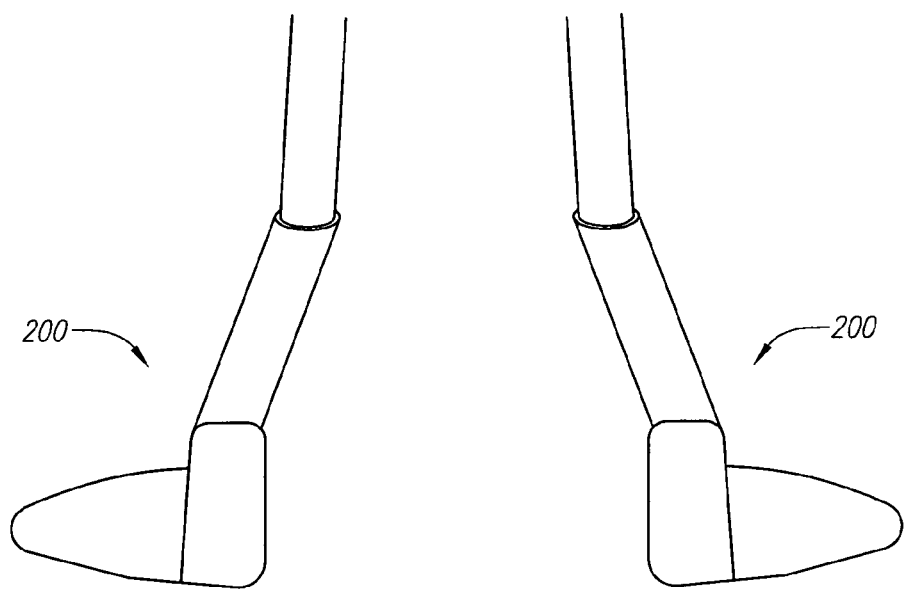
FIG. 4
FIG. 5

GOLF CLUB HEAD COMPOSED OF DAMASCENE PATTERNED METAL

CROSS REFERENCES TO RELATED APPLICATIONS

The Present Application is a divisional application of U.S. patent application Ser. No. 10/248,067, which was filed on Dec. 13, 2002, now U.S. Pat. No. 6,878,074, which is a continuation-in-part application of U.S. Provisional Application No. 60/343,865, which was filed on Dec. 26, 2001, now abandoned.

BACKGROUND OF THE INVENTION

1. Field of the Invention

The present invention relates to a golf club head composed of a damascene patterned metal.

2. Description of the Related Art

Damascus steel is a 12.sup.th Century metallurgical technique that traditionally has been used to make knives, daggers, swords and scimitar blades. There are two different types of Damascus steel, wootz Damascus and pattern-welded Damascus, both of which have a unique and distinctive pattern of light and dark-colored areas throughout the steel. Wootz Damascus, the original Damascus, was made of wootz steel found in India. Wootz steel is a relatively high purity iron steel with about 1.5% carbon and trace amounts of impurities, such as silicon (0.04%), manganese (0.06%), phosphorus (0.1%) and sulfur (0.02%). When wootz steel is forged, cementite particles precipitate and align into bands or sheets. A distinctive pattern of white or light-colored cementite bands against a nearly black steel matrix is created when the forged wootz steel is polished and etched in acid to review the sculpted lines.

The distinctive damascene pattern of pattern welded Damascus steel comes from alternating sheets of high and low-carbon steels. The different sheets of steel are repeatedly drawn, folded and forge welded together. The forge welded steel may then be polished and etched to enhance the contrast between the two steels.

These days, the terms Damascus and damascene are not just limited to steel, but describe other materials that have a distinctive pattern throughout the material.

Golf club heads are typically made of metals, such as steels, titanium, titanium alloys, and other materials, including composites. The metals traditionally used in golf club heads are homogeneous and have no discernable pattern either on the surface of or through the metal. Golf clubs with club heads that have unique patterns in their metal may appeal to consumers. Thus, there is a need for an improved golf club head made of a damascene patterned metal.

BRIEF SUMMARY OF THE INVENTION

The present invention is a golf club head made of a damascene patterned metal The golf club head may be a putter head or an iron-type club head with a majority of the club head body formed of the damascene patterned metal, or a wood-type club head or an iron-type club head with a damascene patterned metal face insert.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 3 is a front view of the putter head of FIG. 1.

FIG. 4 is a toe end view of the putter head of FIG. 1.

FIG. 5 is a heel end view of the putter head of FIG. 1.

DETAILED DESCRIPTION OF THE INVENTION

Figure 1:
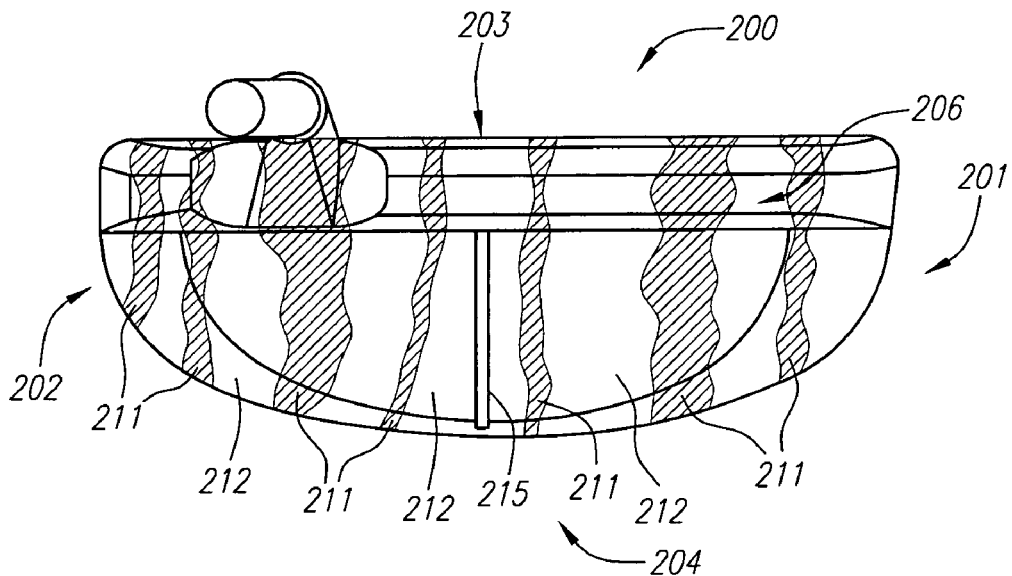
FIG. 1 is a top plan view of a putter head composed of a damascene patterned metal in accordance with the present invention.
Figure 2:
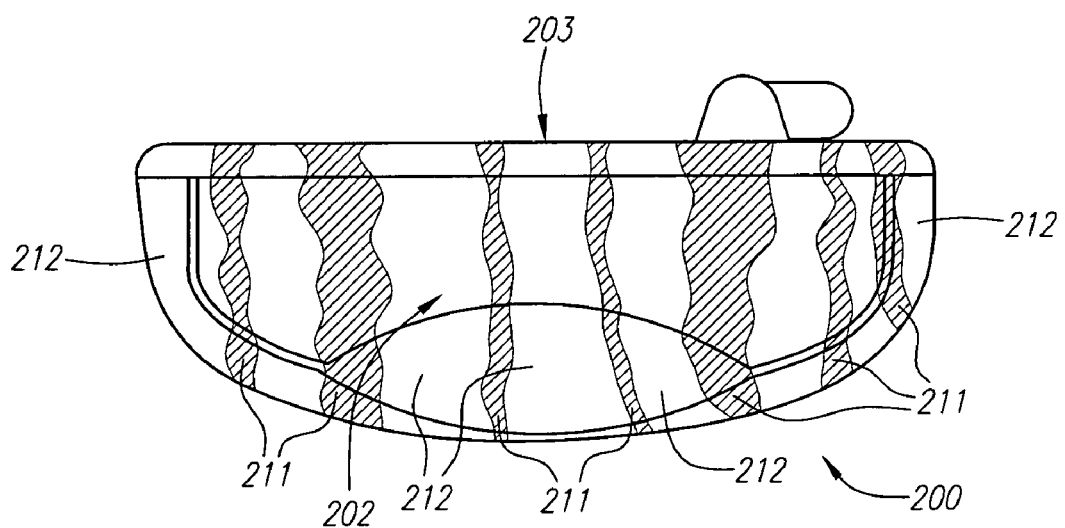
FIG. 2 is a bottom view of the putter head of FIG. 1.

FIGS. 1–5 illustrate a putter head 200 composed of a damascene patterned metal in accordance with the present invention. The putter head 200 has a body that includes a toe side 201, a heel side 202, a front or face 203, a rear 204, a sole 205 and a crown or top 206. The face 203 illustrates the distinctive pattern of the damascene patterned metal with area 211 and area 212 composed of different materials. The damascene patterned metal used to make the putter head 200 is preferably composed of stainless steel 304L and stainless steel 316L. The putter head 200 may also be composed of Damascus steel. One of ordinary skill in the art will appreciate that other steel compositions and even other metals may also be used. For example, the damascene patterned metal may be composed of two different types of titanium: an alpha titanium, such as pure titanium; and a metastable beta titanium alloy, such as a 15-3-3-3, 13-11-3 or beta-C titanium alloy. In addition, other suitable metals, such as nickel and copper, may be combined to produce the damascene patterned metal.

Figure 6:
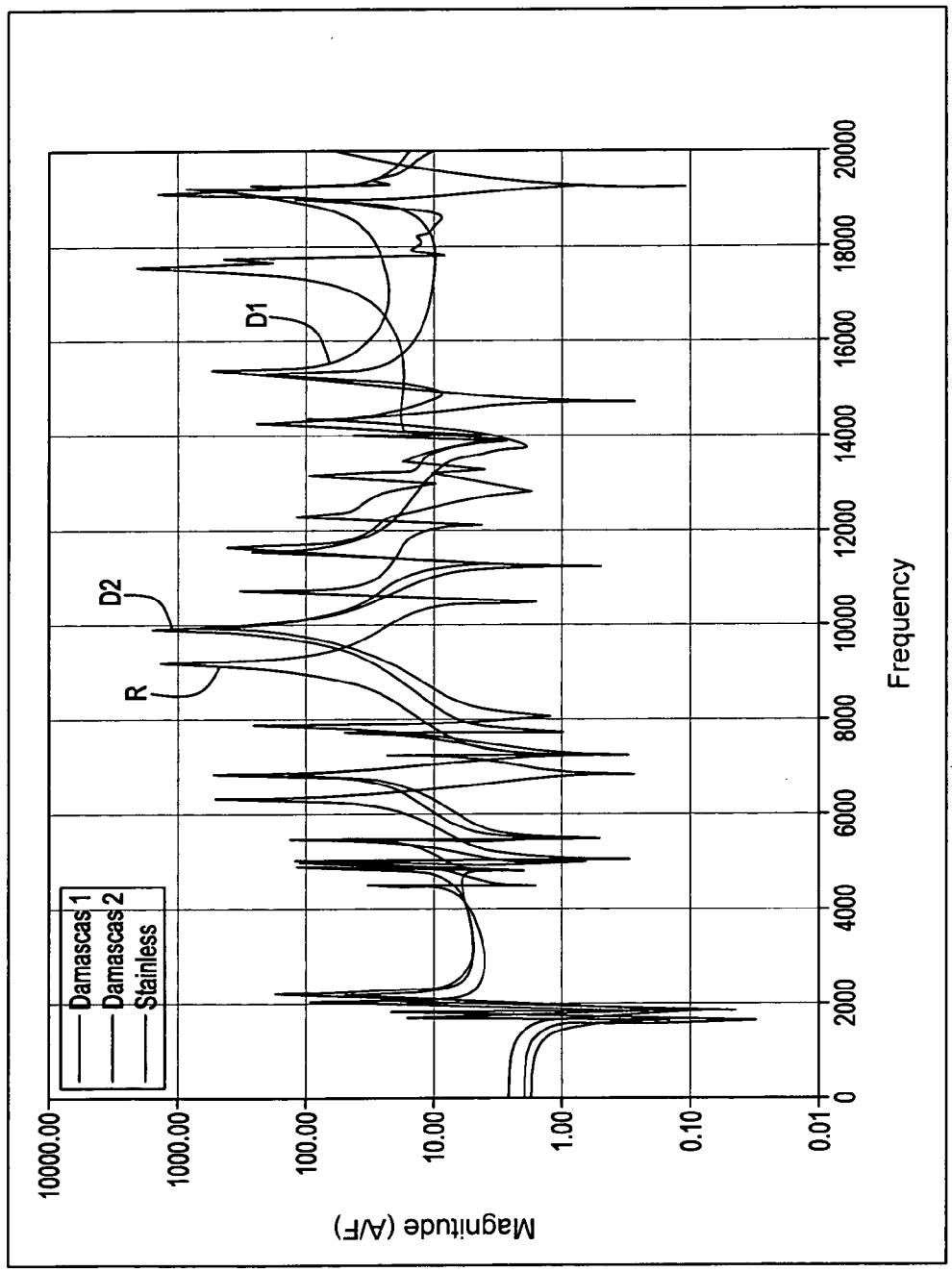
FIG. 6 is a graph of the magnitude versus frequency for three different putters.

The damascene patterned metal provides the putter head 200 with improved feel. FIG. 6 is a chart illustrating the difference between two putters composed of damascene patterned steel D1 and D2 and a putter composed of regular stainless steel R. Based on frequency analysis, the damascene patterned steel putters D1 and D2 had higher peaks in amplitude and a higher frequency. This difference in frequency was clearly audible. It is believed that the higher the frequency of a putter, the better the putter feels during a putt. It is believed that the modulus of the material influences the frequency.

In a putter head the damascene patterned metal may also be used to heel and toe weight the putter head 200 by placing more of the heavier and denser material at the toe and heel ends of the putter head. This is accomplished by initially locating these heavier and denser materials in defined areas within a billet 50 (FIG. 10) before forging and/or machining the billet 50 into the shape of a putter head body.

As illustrated in FIG. 1, the damascene patterned metal may also be used to provide alignment features for a putter head 200. The pattern formed in the damascene patterned metal may be used in conjunction with or in lieu of an additional alignment feature 215 on the top 206 of the putter head 200. Further, softer metals, such as nickel or copper, may be used in the area of the striking face in order to yield a softer feel. In such an embodiment for a soft feeling face, the layers of the laminate damascene patterned metal are vertical layers that alternate from the face 203 to the rear 204, as opposed to varying from the toe 201 to the heel 202 as shown in FIG. 3.

Figure 7:
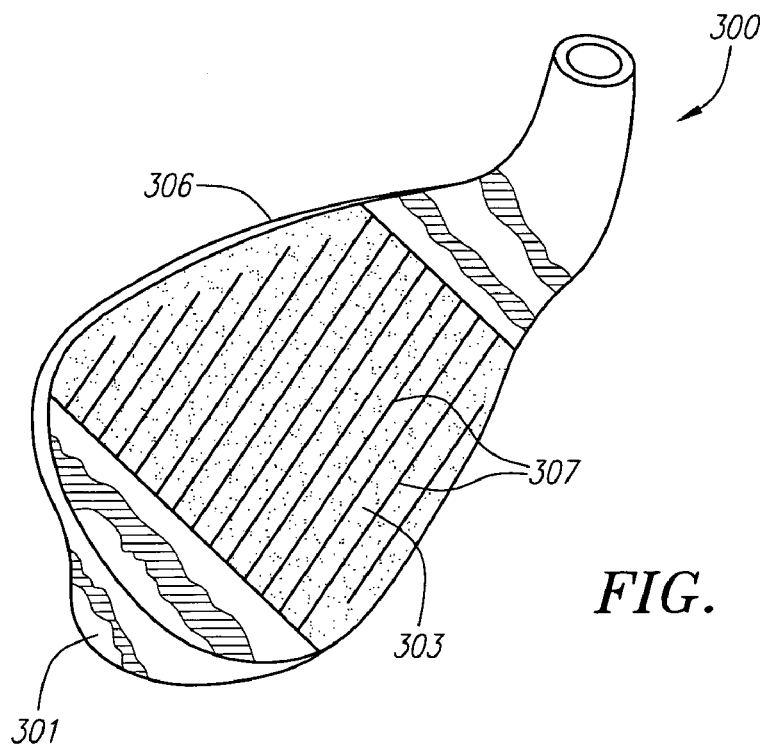
FIG. 7 is a front perspective view of an iron-type club head composed of a damascene patterned metal in accordance with the present invention.
Figure 8:
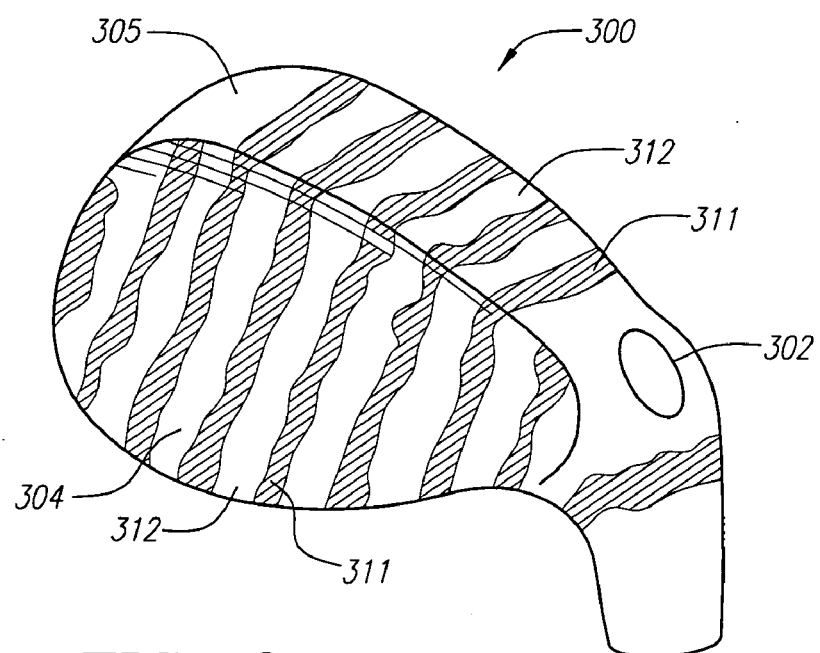
FIG. 8 is a back perspective view of the iron-type club head of FIG. 7.

FIGS. 7 and 8 illustrate an iron-type club head 300 composed of a damascene patterned metal in accordance with the present invention. The iron-type club head 300 has a body that includes a toe side 301, a heel side 302, a front or face 303, a rear 304, a sole 305 and a top 306. The front face 303 provides a ball-striking surface with a plurality of scorelines 307. The rear 304 illustrates the distinctive pattern of the damascene patterned metal with area 311 and area 312 composed of different materials. The iron-type club head 300 may have an improved feel over other iron-type club heads.

Figure 9:
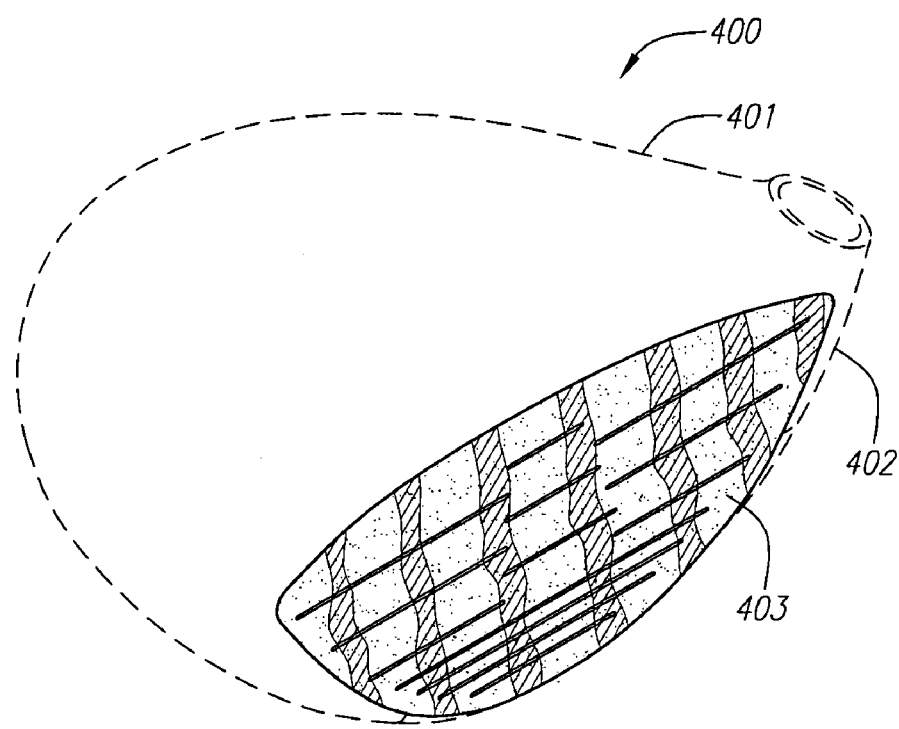
FIG. 9 is a perspective view of a wood-type club head (in phantom lines) with a face insert composed of a damascene patterned metal in accordance with the present invention.

The damascene patterned metal may also be used to form a portion of a golf club head, such as a face insert for an iron-type or wood-type club head. FIG. 9 illustrates a wood-type golf club head 400 with a face insert 403 composed of a damascene patterned metal. A general description of a wood-type club head with a face insert is disclosed in U.S. Pat. No. 6,364,789, filed on Dec. 30, 1999 and issued on Apr. 2, 2002, for a Golf Club Head, U.S. Pat. No. 6,348,015, filed on Mar. 14, 2000 and issued on Feb. 19, 2002 for a Golf Club Head Having a Striking Face with Improved Efficiency, and U.S. Pat. No. 6,338,683, filed on Dec. 30, 1999 and issued on Jan. 15, 2002 for a Striking Plate for a Golf Club Head, all of which are hereby incorporated by reference in their entirety. The wood-type golf club head 400 has a body 401 with an opening 402 formed in a front face thereof. The face insert 403 covers the opening 402. The face insert 403 is composed of a damascene patterned metal, such as Damascus steel or the stainless steel 304L and stainless steel 316L composite, which provides improved strength and deflection characteristics.

The bodies of the putter head 200 and iron-type club head 300 and the face insert for an iron-type or wood type club head 400 are formed from a billet 50 or cylindrical bar (not shown) of damascene patterned metal. As will be described in greater detail below, the billet 50 or bar of the damascene patterned metal is preferably forged into a rough shape of the club head part and then machined to the final dimensions and polished.

Figure 11:
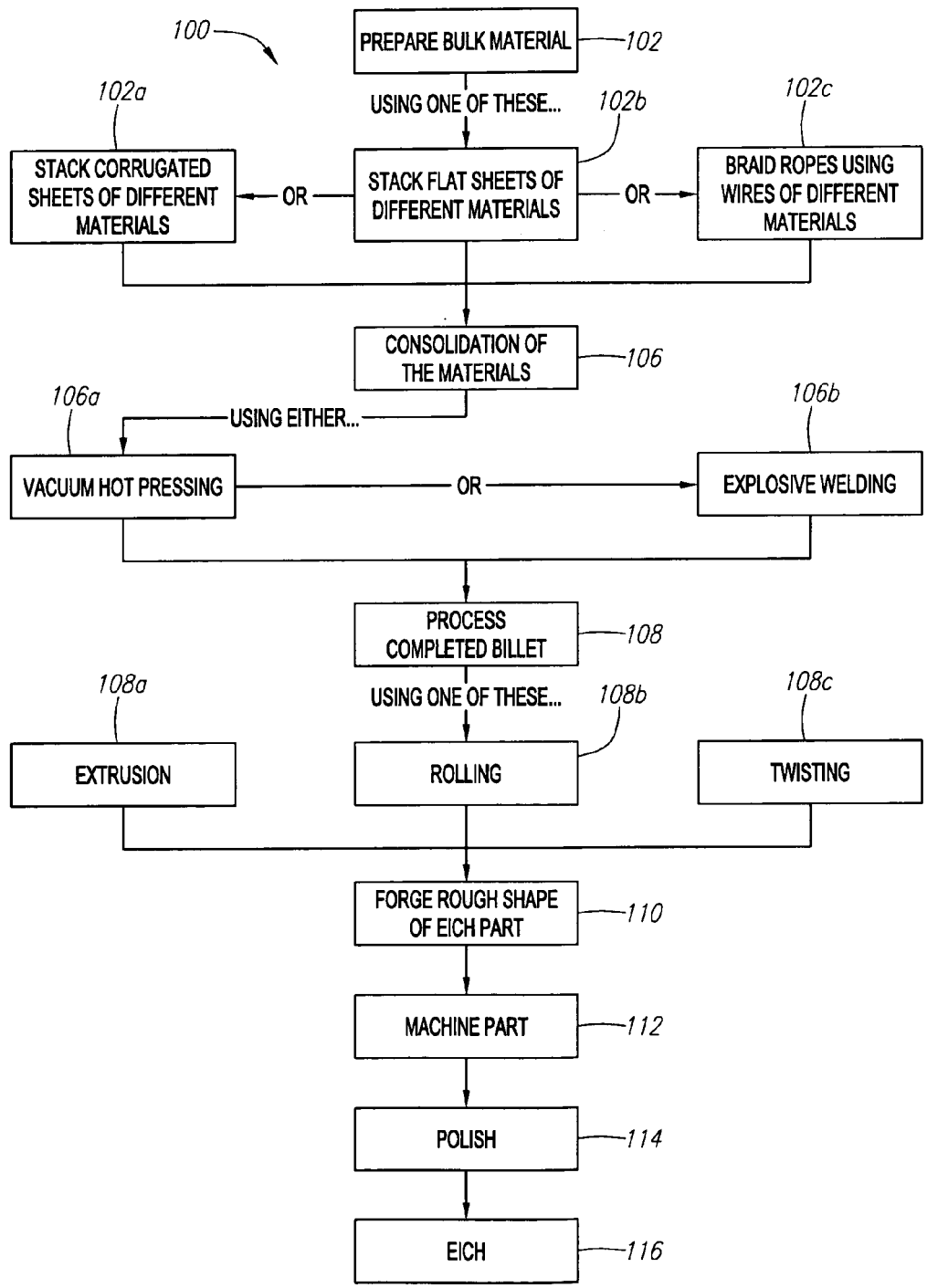
FIG. 11 is a flow chart illustrating a method for preparing a damascene metal and manufacturing a golf club head part.

FIG. 11 is a flow chart of illustrating the a method 100 for preparing a club head composed of a damascene patterned metal. The method 100 begins at step 102 with the preparation of a bulk material. The bulk material may be prepared by any one of the following procedures: stacking corrugated sheets of different materials at block 102a; stacking flat sheets of different materials at block 102b; or braiding ropes using wires of different materials at block 102c. Two or more different materials may be stacked or braided to form the bulk material.

Figure 10:
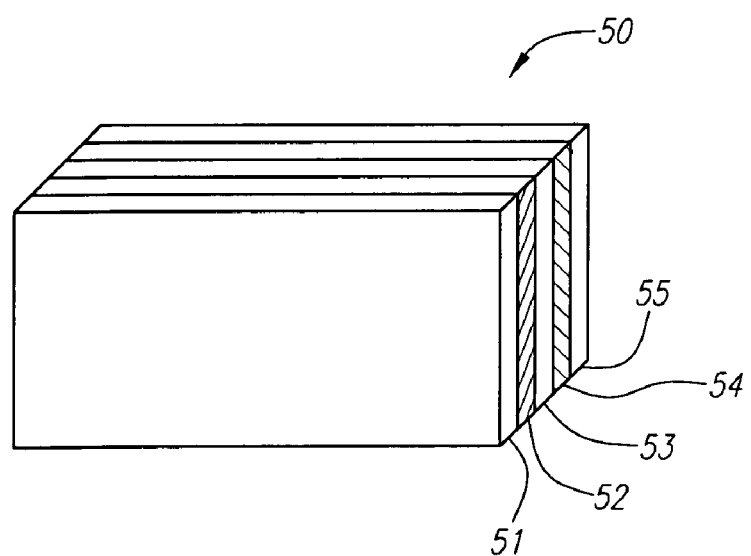
FIG. 10 is a perspective view of a billet of a damascene patterned metal.

FIG. 10 is an illustration of a billet 50 of bulk material. The billet 50 illustrated has five layers 51–55, however, a billet may include greater than or fewer than five layers. Each layer of the billet 50 is composed of a material that is different from that of adjacent layers. The billet 50 maybe include as few as two different layers of material, alternately stacked together, or have all five layers 51–55 of different materials. One preferred billet for making golf club heads is a damascene patterned steel that includes alternating layers of stainless steel 304L and stainless steel 316L. Another such billet is a damascene patterned titanium that include layers of an alpha titanium, such as pure titanium, and layers of a metastable beta titanium, such as a 15-3-3-3, 13-11-3 or beta-C titanium alloy. Metals such as nickel, copper, brass, cobalt, zirconium and others may also be used. The thicknesses of the layers of materials may vary depending on the desired amount of each material.

At block 106 the materials are consolidated to provide a strong bond between the different metal layers. The bonding may be enhanced if there is a chemical reaction between the various components. Two different processes that may be used to consolidate the different layers of material in the billet include vacuum hot pressing and diffusion bonding at block 106a and explosive welding at block 106b.

In the vacuum hot pressing and diffusion bonding step 106a, the bulk material, which was prepared by any one of steps 102a–102c, is heated to an elevated temperature under pressure. Bonding may be significantly enhanced if one of the materials is heated to its melting point and liquefies. Solid state diffusion is also possible, however, it may be necessary to maintain the bulk material at the elevated temperature for a longer period of time. Mechanical adhesion may not work as well if the materials have very different coefficients of thermal expansion.

The other process for consolidating the materials is explosive welding, block 106b. This process involves bonding the metals using pressure or a shock wave. An explosive charge is ignited behind the bulk materials to generate the pressure needed to bond, or explosively weld, the materials. The large pressure forces the metal atoms of adjacent materials together to form a metallurgical bond. The interface between the different layers of metal is very distinct, and there appears to be no evidence of melting of the metals. Explosive welding is an effective way of joining dissimilar materials, such as steel, copper and brass, or steel and titanium, however, it is limited in its ability to join high strength materials.

After the billet 50 is consolidated, either by vacuum hot pressing or explosive welding, at step 108, the billet 50 is further processed to create unique patterns. The billet 50 may be further processed by extrusion at step 108a, rolling at step 108b, or twisting at step 108c, to distort the laminar structure and diffuse the layers. These processes produce various patterns, such as ladder, twist, and rose patterns, in the resulting billet or cylindrical bar.

Yet another possibility for consolidating different metals includes adding different amounts of two metals that have extensive solubility in the liquid state but very limited solubility in the solid state. When the composition is solidified, the larger volume first component is in a continuous phase, while the second component remains in discrete globules. The composition is further deformed, and the second component that was in discrete globules is distorted by the surrounding larger volume first component. Thus, for example, if the solidified composition in billet form were to be extruded into a rod, the second component would be extended as rods in the larger volume component. If the solidified composition in billet form were rolled into sheets, the second component would appear as discs embedded in the larger component. Thus, unique patterns could be achieved for each golf club head body or face insert.

At step 110 the billet 50 is then forged into a rough shape of a golf club head part. As discussed above, the part may be the body of a putter head or iron-type club head or a face insert for an iron-type club head or wood-type club head.

Forging further alters the pattern in the billet 50 to obtain a golf club head part with a unique pattern. Thus, no two golf club heads will have the identical damascene pattern in the metal.

At step 112 the piece that was forged at step 100 into the rough shape of golf club head part is then machined to its precise dimensions. Alternatively, the forging step 110 may be skipped altogether, and the billet machined directly to form the final golf club head part. Either procedure creates a golf club head or face insert that is unique, since the pattern resulting in each billet is different.

At step 114 the final club head part is polished to provide the proper finish.

At step 116, the polished club head part may then be etched with a suitable acid to accentuate the detail of the damascene pattern in the metal.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A method for forming a golf club head comprising:
   providing a bar composed of a damascene patterned metal;
   forging the bar of damascene patterned metal into a rough shape of at least a portion of a golf club head;
   machining the forged, rough shape of the portion of the golf club head; and polishing the machined portion of the golf club head.

2. The method according to claim 1 wherein providing the bar of damascene patterned metal includes providing a bar composed of at least two metals having different properties.

3. The method according to claim 2 wherein providing the bar of damascene patterned metal comprises:
   alternately stacking layers of a first metal and layers of a second metal; and consolidating the first and second metals.

4. The method according to claim 3 wherein the first metal is stainless steel 304L and the second metal is stainless steel 316L.

5. The method according to claim 3 wherein the first metal is an alpha titanium and the second metal is a metastable beta titanium.

6. The method according to claim 3 wherein the first metal is copper and the second metal is nickel.

7. The method according to claim 1 wherein forging the bar of damascene patterned metal includes forging the bar into the rough shape of a club head body.

8. The method according to claim 7 wherein the club head body is selected from the group consisting of a putter head and an iron-type club head.

9. The method according to claim 7 wherein the club head body is selected from the group consisting of an iron-type club head and a wood-type club head.

10. The method according to claim 1 wherein forging the bar of damascene patterned metal includes forging the bar into the rough shape of a face insert for the golf club head.

11. The method according to claim 1 further comprising etching the polished, machined portion of the golf club head.

* * * * *